E. P. BURRELL.
TOOL HOLDING TURRET.
APPLICATION FILED DEC. 18, 1913.
1,140,733.   Patented May 25, 1915.
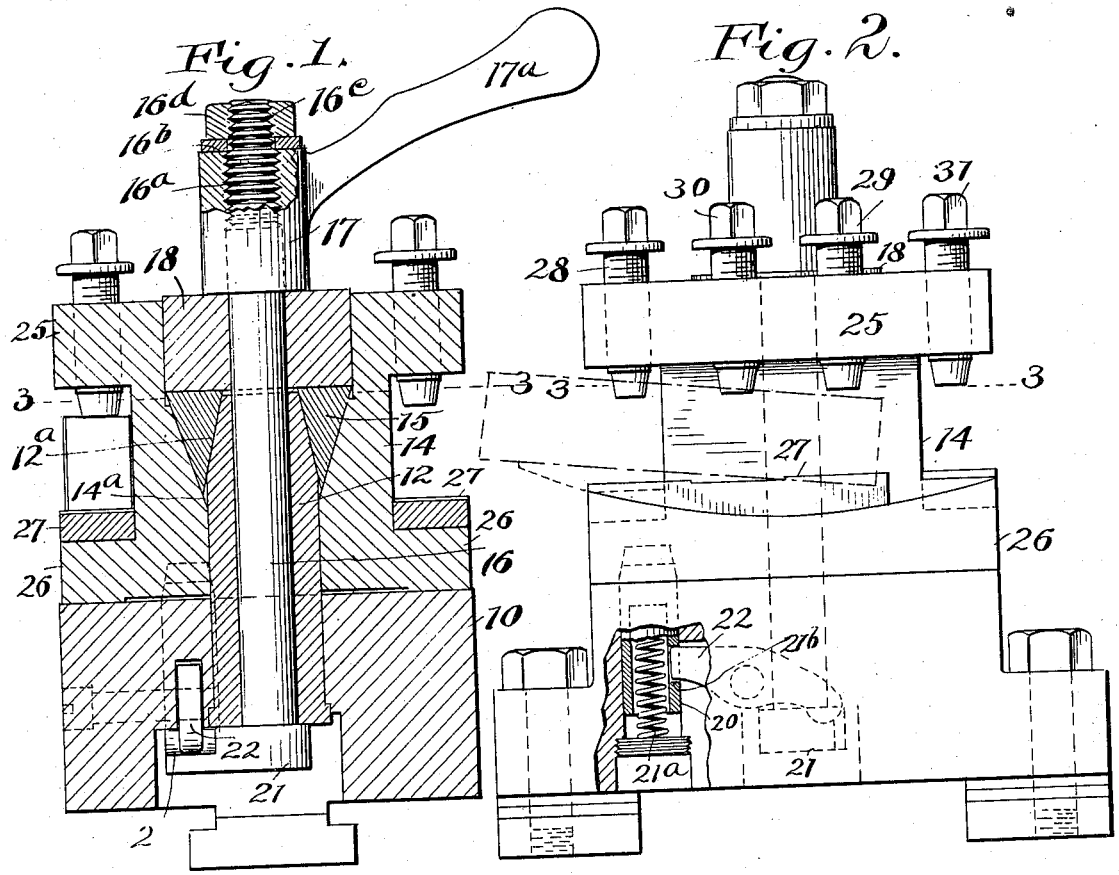
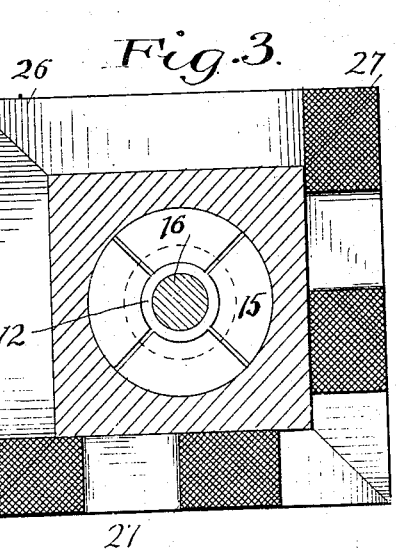
Witnesses
E. B. Gilchrist
L. I. Porter
Inventor.
Edward P. Burrell
by Thurston & Kwis
Attorneys

UNITED STATES PATENT OFFICE.

EDWARD P. BURRELL, OF CLEVELAND, OHIO, ASSIGNOR TO THE WARNER AND SWASEY COMPANY, OF CLEVELAND, OHIO, A CORPORATION OF OHIO.

TOOL-HOLDING TURRET.

1,140,733.    Specification of Letters Patent.    Patented May 25, 1915.

Application filed December 18, 1913. Serial No. 807,368.

*To all whom it may concern:*

Be it known that I, EDWARD P. BURRELL, a citizen of the United States, residing at Cleveland, in the county of Cuyahoga and State of Ohio, have invented a certain new and useful Improvement in Tool-Holding Turrets, of which the following is a full, clear, and exact description.

This invention relates particularly to novel means, by which a rotatable tool holding turret of a lathe may be accurately centered and clamped in various working positions,—that is to say, with any of its tool holding faces in working position.

The invention is shown in connection with a turret intended to be secured upon the cross slide of a lathe; and this particular form of turret also embodies certain improvements by means of which a tool may be held upon each of the sides of said turret and given a wider range of positional adjustment than has heretofore been possible.

In the drawing, Figure 1 is a central vertical section of said turret. Fig. 2 is a side elevation of a turret embodying the invention with a portion of the base member broken away to show the index pin mechanism. Fig. 3 is a sectional plan view in the plane indicated by line 3—3 on Fig. 1.
Fig. 4 is a bottom view of the turret shown in the other figure.

The base member 10 is to be rigidly fastened to the slide by which the turret is to be carried. In the form shown, which, as stated, is especially adapted for use on the cross slide of a lathe, this base is shown in a form such that it may be detachably secured to said slide; but this is an immaterial detail. A tubular cylindrical post 12 extends vertically upward from the base member, and is rigid with it, and the upper end 12ª of this post is conically tapered. The turret 14 rests upon the base member, and is rotatable around this post. That part 14ª of the hole in the turret through which the post passes, which is adjacent to the part 12ª of the post, is reversely tapered conically so as to leave between them an annular V-shaped recess. In this recess are a plurality of segmental V-shaped wedges 15 which, when driven down into the V-shaped annular recess between the post and turret, will accurately center the turret and frictionally secure it to the post. A shaft 16 extends up from the post, and has an externally threaded portion 16ª near its upper end. A nut 17, having an operating handle 17ª is screwed onto the threaded portion 16ª of the shaft 16. Below this nut is a clamping block 18 which is preferably square and fits freely in a square recess in the upper end of the turret. By turning this nut on the shaft in one direction it will move down on the shaft against the clamping block 18, whereby the wedges 15 will be driven down in the annular V-shaped recess so as to accurately center the turret and clamp it to the post 12. By turning the nut in the contrary direction, the pressure block and wedges are allowed to move upward so as to free the turret. The shaft 16 in the form shown has, however, an additional function to that which has been described, namely, to withdraw the index pin 20 from its engagement with the turret so that the latter may be turned. In order that the shaft may perform this function it is rotatably mounted in the post 12, and projects below as well as above the same. Secured to the lower end of this shaft and lying in a recess in the base member is an arm 21 having its top face 21ª beveled. The index pin 20 is vertically movable in the base member, and it is moved up by a spring 21ª so that its upper end may project into any of the holes provided therefor in the lower face of the turret. A lever 22 is pivoted to the base; and one end projects into a notch 21ᵇ in the index pin, while the other end of the lever projects to a position where it is in the path of the beveled surface of the arm 21. Above the threaded portion 16ª of the post is an external annular flange 16ᵇ. This flange in the construction shown is formed by a washer which embraces a reduced threaded portion 16ᶜ on said shaft, and lies below and in engagement with a nut 16ᵈ which screws onto said reduced threaded portion. The nut 17 lies between this washer and the clamping block 18.

The turret as shown in the drawing is centered and clamped in working position, and is additionally held against turning by said index pin. If, now, the nut 17 be turned so as to cause it to travel upward on shaft 16, it will not only release its pressure on the pressure block 18, but will soon come into frictional engagement with the washer 16ᵇ. When this has been done, then, by a further turning of the nut, the shaft 16 will also be turned in that direction which will cause the beveled surface 21ª to engage with and rock lever 22, and thereby draw the index pin 21 out of engagement with the turret. The turret may now be turned by hand to bring any of its faces into working position, which movement will also bring a hole in the lower face of the turret into alinement with the index pin. When, now, the operator turns nut 17 in the reverse direction, the first result will be to turn shaft 16 backward so as to release the index pin, and this backward movement will continue until the arm 21 strikes a shoulder 10$^b$, which is a part of the base member. Thereafter, the turning of nut 17 will cause it to move down upon shaft 16 against pressure block 18, whereby the wedges 15 will be driven down so as to center the turret.

The turret is a polygon having vertical faces which stand at angles to each other. Specifically, it is square, but this particular form is not material. In each of these faces is a horizontal tool recess D which extends from one edge of the face to the other, and these tool recesses are merged the one into the other. Each tool recess therefore lies between an overhanging flange 25 and a seat or bottom 26. Each of these seats is concave,—the concavity being on the arc of a circle whose center is in a vertical plane midway between the sides of the face. Resting upon each of the concave seats is a wedge 27 whose lower face is convex upon the same curvature as the seat so as to fit the same. This wedge is, however, thicker at one end than the other, and is substantially shorter than the seat of the tool recess upon which it rests. Set screws 28 and 29 screw down through the overhanging flange of each tool recess. A tool may be put into the tool recess resting upon the flat top face of the wedge 27 therein; said wedge may be adjusted into any practical angular position by moving it endwise, and then the tool in this position may be firmly held by screwing the two set screws 28 and 29 down upon it. The novel features of the described means for holding the tool in various angular positions are to be found in the fact that the concave seats for these wedges extend entirely across the face of the turret from one side to the other, wherefore each intersects at each end with the similar concave seat of the tool recess in both adjacent sides and additionally in the fact that the wedges are made thicker at one end than at the other and shorter than the concave seat. The most valuable practical result of this construction is that it gives a very wide range of adjustment to the several tools without causing them to interfere with the adjustment and position of the tools in the adjacent tool recesses. Another advantage of extending these concave seats entirely across the turret is that the wedge may be taken out and reversed in position so as to permit an equally wide range of adjustment to a tool which is projecting in the opposite direction from said turret. When a tool is caused to project in the opposite direction from that shown in Fig. 2 two other set screws 30 and 31 which screw down through the overhanging flange will be employed to clamp the tool and wedge in the required position.

Having described my invention, I claim:

1. In a lathe the combination of a turret base which is provided with an outwardly extended cylindrical post having a conically tapered upper end, a turret which is supported on said base member and is provided with a cylindrical hole through which said post passes, which hole adjacent to the tapered end of the post is reversely tapered, segmental wedges in the V-shaped recess between said post and turret, and means for driving said wedges down in said recess.

2. In a lathe the combination of a turret base which is provided with an outwardly extended cylindrical post having a conically tapered upper end, a turret which is supported on said base member and is provided with a cylindrical hole through which said post passes, which hole adjacent to the tapered end of the post is reversely tapered, segmental wedges in the V-shaped recess between said post and turret, a shaft which projects up from said post and is externally threaded, and a nut which is screwed onto said threaded part of said shaft.

3. In a lathe the combination of a turret base which is provided with an outwardly extended cylindrical post having a conically tapered upper end, a turret which is supported on said base member and is provided with a cylindrical hole through which said post passes, which hole adjacent to the tapered end of the post is reversely tapered, segmental wedges in the V-shaped recess between said post and turret, a shaft which projects up from said post and is externally threaded, a nut which is screwed onto said threaded part of said shaft, and a pressure block which loosely embraces said shaft and is interposed between said nut and wedges.

4. In a lathe the combination of a turret base which is provided with an outwardly extended cylindrical post having a conically tapered upper end, a turret which is supported on said base member and is provided with a cylindrical hole through which said post passes, which hole adjacent to the tapered end of the post is reversely tapered, segmental wedges in the V-shaped recess between said post and turret, a shaft which passes axially through said post and is rotatable therein, which shaft has an externally threaded upward projection and above that an external annular shoulder, a nut which is screwed onto said threaded portion of the shaft below said annular shoulder, a vertically movable spring actuated index pin mounted in the base for engagement with the turret, an arm fixed to the lower end of said shaft, and means whereby said arm in turning will draw said index pin down.

In testimony whereof, I hereunto affix my signature in the presence of two witnesses.

EDWARD P. BURRELL.

Witnesses:
 L. I. PORTER,
 A. J. HUDSON.